E. B. Bigelow.
Weaving Pile Fabric.
No. 461. Reissued May 5, 1857.
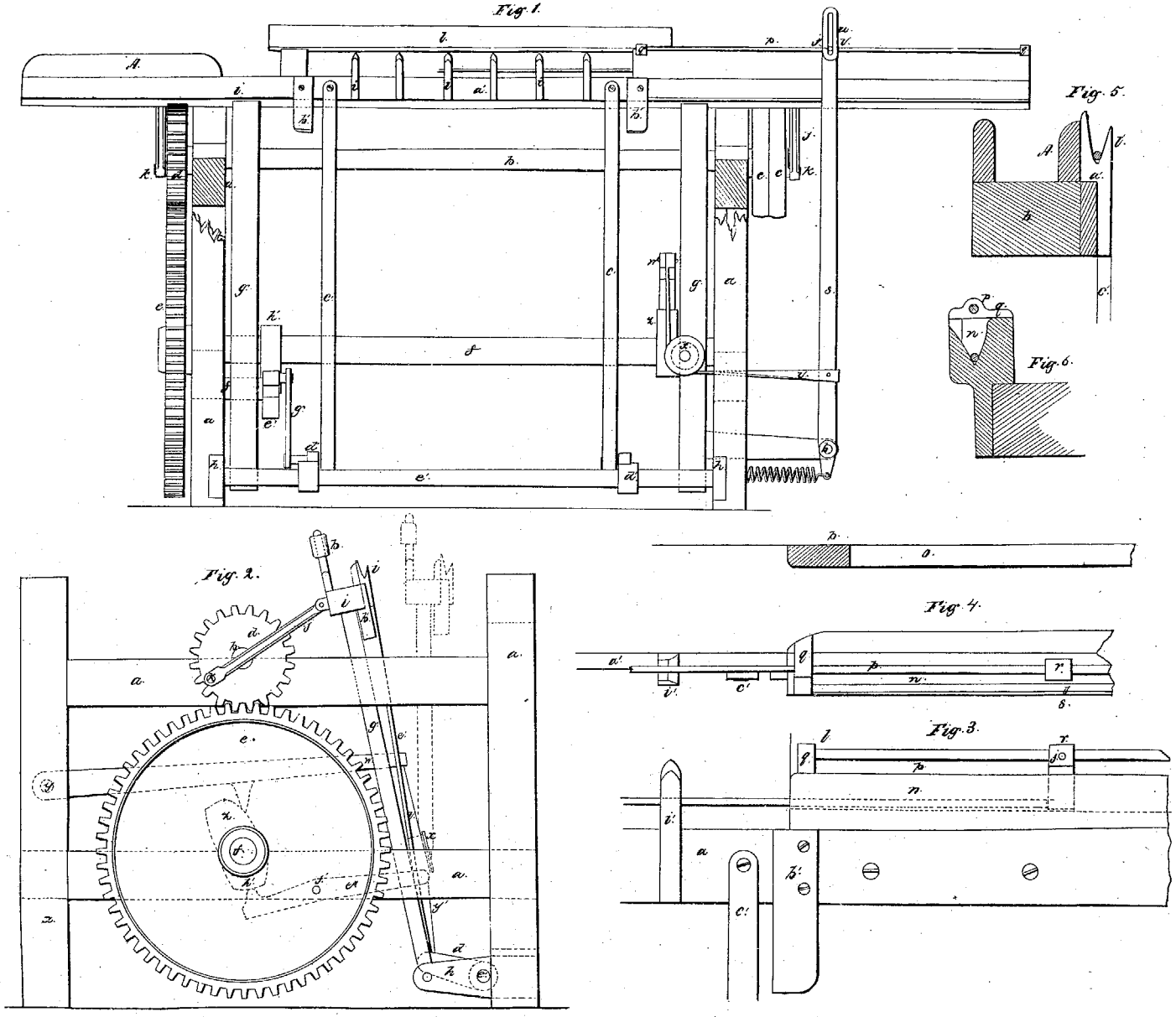
N. PETERS, PHOTO-LITHOGRAPHER, WASHINGTON, D. C.

UNITED STATES PATENT OFFICE.

E. B. BIGELOW, OF BOSTON, MASSACHUSETTS.

IMPROVEMENT IN LOOMS FOR WEAVING BRUSSELS CARPETS, &C.

Specification forming part of Letters Patent No. 6,153, dated March 10, 1849; Reissue No. 147, dated October 9, 1849; Reissue No. 461, dated May 5, 1857.

*To all whom it may concern:*

Be it known that I, ERASTUS B. BIGELOW, of Boston, in the county of Suffolk and State of Massachusetts, have invented certain new and useful Improvements in Power-Looms for Weaving Brussels Carpets and other Piled Fabrics, of which the following is a full and exact description, reference being had to the accompanying drawings and letters of reference marked thereon, which form a part of my specification.

Figure 1 is a front elevation of the loom, with the breast-beam removed to show the lathe. Fig. 2 is a left-hand end elevation. Fig. 3 is an enlarged view of a part of the right-hand end of the race-beam and grooved receptacle or trough for receiving the pile wire or wires. Fig. 4 is a plan of the same. Fig. 5 is a section of the shuttle-box, showing a wire-guide; and Fig. 6 is a section of the lathe and grooved receptacle or trough for holding the pile wire or wires.

In the drawings only such parts of a loom are represented as are necessary to exemplify my said invention.

In weaving carpets and other wide-piled fabrics by pile-wires said wires are usually too slender to be properly introduced into the shed of the warps without being guided and supported.

In my Letters Patent for improvements in machinery for weaving Brussels carpets, &c., dated March 20, 1847, a mode of operating the pile-wires is described, whereby they are drawn from the cloth and deposited in a grooved bar preparatory to their being introduced into the shed of the warps, said grooved bar at appropriate stages of the operation of the loom being passed into the shed of the warps, carrying a pile-wire along with it and depositing it therein, then returning for another wire to be carried in in the same manner.

By my present invention the pile wire or wires, instead of being carried into the shed of the warps, as has heretofore been done, are pushed in from a grooved receptacle or trough over or through a guide or guides or supports.

The nature of my said invention therefore consists, first, in combining with one or more pile-wires for weaving piled fabrics a grooved receptacle or trough so constructed and organized with respect to the other parts of the loom as to hold said pile wire or wires in position while being pushed into the shed of the warps; second, in pushing said pile wire or wires from a trough or groove into the shed of the warps by a driver or pusher moving at appropriate intervals toward and from the warps or cloth; third, in guiding and supporting said pile-wires as they are being introduced into the shed of the warps by a guide or guides through, over, or on which said pile-wires slide.

The frame of the loom is represented by *a a a*.

*b* is the lathe-shaft, which has the driving-pulley *c* affixed to its right-hand end. To the other end of the lathe-shaft *b* the cogged wheel *d* is affixed, which engages with the cogged wheel *e*. The relative proportions of the cogged wheels *d* and *e* are as one of the former to three of the latter. The cogged wheel *e* is affixed to and turns the cam-shaft *f*.

*g g* are the swords of the lathe, which are supported at their lower ends by the stands *h h*, projecting from the frame *a*.

*i* represents the race-beam of the lathe, connected with the upper ends of the swords *g g*. The lathe is connected with the lathe-shaft *b* by the connecting-bars *j j*, one of which is attached to the driving-pulley *c* and the other to the cogged wheel *d* by their respective stud pins *k k*.

*l* represents the reed frame in the common form.

To one end of the lathe a shuttle-box is applied in the ordinary way, as seen at A, Fig. 1, but from the other end thereof the race-beam is made to project beyond the shuttle-box to support the grooved receptacle or trough for holding the pile wire or wires, as seen at B.

The grooved receptacle or trough *n* may be composed of any suitable material and formed with a groove opening upward, as represented in Fig. 6. The back side of said receptacle or trough *n* is made straight and attached to the front side of the race-beam in such a manner as to form the front side of the shuttle-box at this end of the lathe, as seen in Fig. 4.

O represents the back part of the same shuttle box, which is constructed in the ordinary way. A rod, *p*, is placed over the groove of the grooved receptacle or trough *n*, and is supported by the standards *q q*, as represented in Figs. 1 and 6.

*r* is the wire pusher or driver, the upper end of which clasps the rod *p*, while the lower end is suitably formed to act on the outer ends of the pile wire or wires and push them into the shed. The wire pusher or driver *r* traverses the rod *p* at proper periods of time for pushing the wires into the shed of the warp, and receives its motion from the upright lever *s*. The lever *s* vibrates on the stud *t*, at its lower end, and is connected at its upper end to said pusher or driver *r* by the pin *j'*, which extends therefrom and works in the slot *u*.

*v* is a strap, one end of which is connected with the lever *s* and the other to the treadle *w*.

*x* is a pulley turning upon a stud, projecting from one of the swords *g* of the lathe, around which the strap *v* passes to change the direction of its motion.

The treadle *w* vibrates on the stud *y*. (Shown by the dotted lines in Fig. 2.) The cam *z* is affixed to the cam-shaft *f*, and actuates the pusher or driver *r* through the intermediate parts just described.

The pile wire or wires may be drawn from the cloth and transferred to the grooved receptacle or trough *n* in the same manner as described in my said Letters Patent for new and useful improvements in machinery for weaving Brussel carpets, &c., dated March 20, 1847.

When a pile-wire is placed in the grooved receptacle or trough *n*, as seen in Fig 6, and the pusher or driver *r* is at the outer end of the rod *p*, it is evident that when the said pusher or driver *r* is moved forward toward the loom it will carry said pile wire along with it into the warp, as seen in Fig. 1, where the blue lines represent it as being partly inserted.

The guide or guides for guiding and supporting the pile-wires as they are introduced into the shed of the warps I shall now describe.

*a*, is a plate or bar which is situated on the front side of the race-beam and slides up and down in the guide-plates *b' b'*. The guide-plates *b' b'* are formed with grooves in their inner edges, which receive their respective ends of the plate or bar *a'*, as seen in Fig 1.

*c' c'* are connecting-bars, the upper ends of which are attached to the bar *a'* and their lower ends to their respective arms *d' d'*. The arms *d' d'* are affixed to the shaft *e'*, which is supported by the stands *h h*.

*e''* is a lever which vibrates on the stud *f'*, and is connected at one end to one of the arms *d'* by the bar *g'*, and actuated at the other end by the cam *h'*. The cam *h'* is affixed to the cam-shaft *f*, and communicates motion to the plate *a'* through the medium of the intervening parts just described.

*i' i'* are guides extending upward from the plate *a'*, which form the support and guide for the wires. These guides have a groove or opening in their upper ends to receive the wires, as represented in Figs. 2 and 5.

The sides of the grooves or openings next to the grooved receptacle or trough are made tunnel-shaped, as shown in Fig. 4, to facilitate the ingress of the wires. The upper ends of the guides *i' i'* are made wedge-shaped, that they may freely pass between the warps. During the operation of forming the cloth the plate *a'* is depressed, so as to bring the points of the guides *i' i'* below the warps. Then, where a pile-wire is to be introduced into the shed of the warps, said plate is raised, and the guides *i' i'* pass up through the lower part of the warps to the position shown in the drawing. Then, after a pile wire has been driven through the guides *i' i'* by the aforesaid pusher or driver *r*, said guides fall and leave the wire in the shed of the warps.

I have described the aforesaid guide or guides as working in connection with a certain mode of drawing the pile-wires from under the pile of the cloth and transferring them to a groove or trough preparatory to their being passed through said guide or guides, which mode of drawing and transferring said wires is described in my Letters Patent above referred to, bearing date 20th of March, A. D. 1847; but I do not consider this connection as material to the use of my present invention, as it may be in whole or in part used equally well in connection with any other mode of drawing the wires from the pile. Nor do I intend to limit myself to the precise construction and form of the guide or guides above described, as the number of guides to be used, their form, and position must necessarily be varied to conform to the width of the cloth to be wrought and the machinery to be employed to draw the wires from the cloth and slide them through or over said guide or guides—as, for example, when comparatively short wires are to be used, one guide placed at the side of the warps for the wire to slide over will be sufficient to support and guide it. When longer wires are to be used, more guides will be required, which guides may be made to pass up or down through the warps to bring them into proper position to receive the wires.

The change of form and motion required to use the aforesaid invention in connection with looms of different widths, and also in connection with the various modes of drawing the wires from the cloth and pushing them through or over said guide or guides, is such as will be obvious to any machinist acquainted with this kind of machinery, and may be made without essentially altering the character of my invention.

Having described my said invention and pointed out some of its modifications, what I claim as new therein, and desire to secure by Letters Patent, is—

1. In combination with the pile wire or wires for weaving piled fabrics, a grooved receptacle or trough for holding said pile wire or wires in position while being pushed into the shed of the warp, substantially as specified.

2. Pushing said pile wire or wires into the shed of the warps by a driver or pusher, substantially as specified.

3. Guiding and supporting the pile-wires as they are inserted into the shed of the warps by a guide or guides through, over, or on which said wires slide, substantially as specified.

E. B. BIGELOW.

Witnesses:
JOHN ZWYNEY,
L. B. BAILEY.